United States Patent [19]
Murakami et al.

[11] Patent Number: 5,494,878
[45] Date of Patent: Feb. 27, 1996

[54] CATALYST FOR EXHAUST GAS PURIFICATION

[75] Inventors: Hiroshi Murakami, Hiroshima; Yasuto Watanabe, Iwakuni; Naoko Sakatani, Hiroshima; Masayuki Koishi, Kure, all of Japan

[73] Assignee: Mazda Motor Corporation, Hiroshima, Japan

[21] Appl. No.: 186,930

[22] Filed: Jan. 27, 1994

[30] Foreign Application Priority Data

Jan. 29, 1993 [JP] Japan .................................. 5-013153

[51] Int. Cl.$^6$ ............................ B01J 21/04; B01J 23/10; B01J 23/44
[52] U.S. Cl. ..................... 502/304; 502/313; 502/328; 502/330; 502/333; 502/339; 423/213.5
[58] Field of Search ................................ 502/304, 313, 502/328, 330, 333, 339; 423/213.5

[56] References Cited

FOREIGN PATENT DOCUMENTS 58-36634  3/1983  Japan .

*Primary Examiner*—Anthony McFarlane
*Attorney, Agent, or Firm*—Fish & Richardson

[57] ABSTRACT

A three-way catalyst is generally used in an automotive exhaust system. This catalyst has a sufficient total content of noble metal active species and is prevented from heat deterioration so that the activity of the noble metal active species can be well utilized at low temperatures to enable the catalyst to exhibit improved purification performance at the low temperatures. The catalyst comprises a first catalyst layer formed on the surface of a honeycomb-shaped carrier and containing Pd (palladium) and alumina ($\gamma$-$Al_2O_3$), and a second catalyst layer formed on the outer surface of the first catalyst layer and containing Pd and ceria ($CeO_2$).

7 Claims, 15 Drawing Sheets

CATALYST FOR EXHAUST GAS PURIFICATION

BACKGROUND OF THE INVENTION

1. Field of the Invention

The present invention relates generally to a catalyst for purifying exhaust gases in automotive exhaust systems and, more particularly, to a three-way catalyst capable of enhancing the purification performance with respect to HC (hydrocarbons) and the like at a low temperature region.

2. Description of Related Art

For use as a catalyst for purifying automotive exhaust gases, a three-way catalyst has long been well known in the art. The three-way catalyst is of a type capable of simultaneously oxidizing CO (carbon monoxide) and HC (hydrocarbons) and reduce NOx (nitrogen oxides). This three-way catalyst generally comprises $\gamma$-alumina ($\gamma$-$Al_2O_3$) carried by a carrier and deposited with, for example, Pt (platinum) and Rh (rhodium) as noble metal active species, and is known to exhibit a relatively high purifying efficiency with exhaust gases which have resulted from burning of an air-fuel mixture of about 14.7 in stoichiometric air-to-fuel ratio.

One example of such three-way catalyst is disclosed in, for example, Japanese Laid-Open Patent Publication (unexamined) No. 58-36634. This catalyst comprises ceria ($CeO_2$) and at least one of Pt and Pd (palladium) which are carried by a catalyst carrier. The component ceria has an $O_2$ storage effect such that when the exhaust gases are in a lean condition, the ceria adsorbs $O_2$ in the exhaust gases, whereas when the exhaust gases are in a rich condition, the adsorbed $O_2$ is released, so that the ceria can contribute to oxidation and purification of HC and CO. Through such $O_2$ storage effect can the exhaust gas atmosphere be brought close to the stoichiometric air-to-fuel ratio and, therefore, Pt and/or Pd is enabled to fully exhibit the activity thereof to thereby effectively purify the exhaust gases.

However, such prior art three-way catalyst is subject to heat deterioration at high temperatures because Pt and Pd components as noble metal active species may become alloyed, or individual Pt components or Pd components may become sintered. As a consequence, the activity of Pt and/or Pd components is lowered, with the result that the catalyst will not exhibit any such purification capability as expected at low temperatures.

In this regard, theoretically it may be conceivable that if the total content of noble metal active species in the catalyst is reduced, any heat deterioration due to alloying, sintering or the like is unlikely to occur. As a matter of fact, however, where the total content of such metal is reduced, the absolute purification capability of the catalyst is lowered. This will in no way be acceptable from the standpoint of practical use.

SUMMARY OF THE INVENTION

The present invention has been developed to overcome the above-described problem, and an objective of the present invention is to provide an exhaust gas purifying three-way catalyst which has a sufficient total content of noble metal active species and yet is adapted to be prevented from heat deterioration so that the activity of the noble metal active species can be well utilized at low temperatures to enable the catalyst to exhibit an improved purification performance at the low temperatures.

In accomplishing the above and other objectives, according to a first aspect of the present invention, there is provided an exhaust gas purifying catalyst dispersedly containing Pd as noble metal active species in the thickness direction of catalyst layers.

More specifically, the catalyst comprises a catalyst carrier, a first catalyst layer formed on the catalyst carrier and containing Pd and alumina, and a second catalyst layer formed on the outer surface of the first catalyst layer and containing Pd and ceria.

Preferably, the weight ratio of the Pd content of the second catalyst layer to the Pd content of the first catalyst layer is within the range of 3/7 to 9/1.

Advantageously, at least one of the first and second catalyst layers contains Ir in the form of a composite with an alkali earth metal or a rare earth metal.

Also advantageously, the alumina has a specific surface area of 300 $m^2/g$ or more and contains dispersed therein at least one of substances selected from the group consisting of La, Ba and Zr.

Preferably, at least one of the first and second catalyst layers contains at least one of substances selected from the group consisting of Si, Mg, Cr and Mo.

As above described, according to the present invention, Pd is dispersed in two separate catalyst layers, namely, the first catalyst layer formed on the surface of the catalyst carrier, and the second catalyst layer formed on the outer surface of the first catalyst layer. This means good dispersion of Pd in the direction of thickness of the first and second catalyst layers. In the second catalyst layer, ceria is present between Pd components and this assures better Pd dispersion. By virtue of such arrangement, any possible decrease of Pd activity due to sintering can be inhibited without involving a decrease in the total Pd content. Further, because of the fact that only one kind of noble metal active species, i.e., Pd, is used, it is unlikely that alloying will occur as in the case of Pd being used in combination with Pt, for example. Another advantage is that as the noble metal active species, Pd has higher heat resistance than Pt. On the other hand, ceria is present in the second catalyst layer, a position for ready contact with exhaust gases, so that it can go into fast reaction with exhaust gases. This fact permits the $O_2$ storage effect of the ceria to be efficiently exerted, thus rendering the exhaust gas atmosphere to be brought close to the stoichiometric air-to-fuel ratio. Accordingly, the range of the air-to-fuel ratio within which purification factors are 80% or more with respect to HC, CO and NOx can be enlarged. The alumina component has a high ratio of surface to volume, and this helps increase the reactivity of the catalyst itself. Further, since the alumina is present in the first catalyst layer on which is placed the second catalyst layer, the influence of exhaust gas heat upon the alumina is alleviated by the second catalyst layer, so that the alumina can be prevented from being subject to crystal changes due to heat. Thus, any appreciable decrease in the specific surface area of the alumina due to such crystal change is inhibited and accordingly the reactivity of the catalyst can be well maintained.

Where Pd is dispersed in two catalyst layers, i.e., the first and second catalyst layers, within a weight ratio (second catalyst layer/first catalyst layer) range of 3/7 to 9/1, the Pd dispersion in the thickness direction of the first and second catalyst layers and the total Pd content can be well balanced. If the weight ratio is less than 3/7 or more than 9/1, Pd dispersion in the thickness direction and/or in the catalyst layers in which Pd is present is hindered, with the result that the catalyst would be no much different in respect of purification performance from any conventional catalyst in which Pd is contained in a single catalyst layer.

Furthermore, the Ir component contained in at least one of the first and second catalyst layers has an inherent property such that it can readily adsorb NOx in exhaust gases. This greatly contributes to reduction and purification, and especially to improved purification performance relative to NOx in exhaust gases on the lean side. For this purpose, Ir is in the form of a composite with an alkali earth metal or a rare earth metal, so that the Ir component has improved heat resistance, thus preventing its activity from decreasing due to heat.

Where the alumina has a specific surface area of 300 $m^2/g$ or more, the catalyst is enabled to perform its reactivity at a high level. Further, because of the fact that the alumina contains at least one of substances selected from the group consisting of La, Ba and Zr which impart high heat resistance to the alumina, the alumina is prevented from undergoing a crystal change due to heat, which in turn inhibits a decrease in the specific surface area of the alumina. Thus, the catalyst can maintain high reactivity.

Also, Si, Mg, Cr, and/or Mo contained in at least one of the first and second catalyst layers have an inherent property that they can more readily adsorb sulfides present in exhaust gases, whereby Pd is prevented from being adversely affected by the sulfides in the exhaust gases. Thus, possible decrease in the activity of Pd due to such unfavorable effect can be well prevented.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

Hereinafter the present invention will be described in connection with preferred embodiments thereof.

First Embodiment

Figure 1:
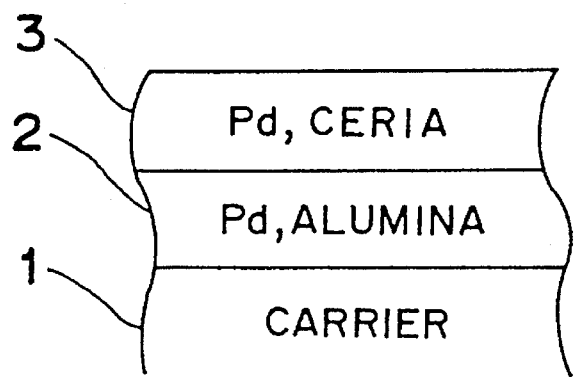
FIG. 1 is a schematic sectional view of an exhaust gas purifying catalyst according to a first embodiment of the present invention.

The catalyst for purifying exhaust gases according to the first embodiment of the present invention comprises a honeycomb-shaped carrier 1 as a catalyst carrier, a first catalyst layer 2 formed on the outer surface of the carrier 1 and containing Pd and alumina, and a second catalyst layer 3 formed on the surface of the first catalyst layer 2 and containing Pd and ceria, as shown in FIG. 1. The Pd content of the first catalyst layer 2 is 4 g/liter (grams per liter of catalyst volume), and the Pd content of the second catalyst layer 3 is 6 g/liter.

This exhaust gas purifying catalyst is produced in the following way. First, in order to form the first catalyst layer 2, 480 g of $\gamma$-$Al_2O_3$ powder, as alumina material, is added with 120 g of boehmite, 1 liter of water and 10 cc of nitric acid, and agitation is effected to provide a slurry. The honeycomb-shaped carrier 1 is dipped in the slurry and then withdrawn therefrom. After excess slurry present on the surface of the carrier 1 is removed by airblowing, the carrier 1 is dried at a temperature of 250° C. for 2 hours and is then calcined at a temperature of 600° C. for 2 hours. Thus, alumina, one of components contained in the first catalyst layer 2, is carried on the surface of the carrier 1.

The alumina is then impregnated with an aqueous solution of dinitrodiamminepalladium ($Pd(NO_2)_2(NH_3)_2$) employed as a Pd material which is so adjusted that a given amount of Pd may be carried on the alumina. The alumina so impregnated is dried at a temperature of 250° C. for 2 hours, and is then calcined at a temperature of 600° C. for 2 hours. Thus, the first catalyst layer 2 comprising the alumina and 4 g/liter of Pd carried on the alumina is obtained.

Then, in order to form the second catalyst layer 3, an aqueous solution of dinitrodiamminepalladium which has been adjusted in the same manner as above noted is added to ceria, and agitation is effected. The resulting mixture is dried and calcined. The calcined material is subjected to ball milling. To 540 g of the resulting powder are added 60 g of boehmite, 1 liter of water and 10 cc of nitric acid, and agitation is effected to provide a slurry. The honeycomb-shaped carrier 1 on which was formed the first catalyst layer 2 is dipped into the slurry. After it is removed from the slurry, the carrier 1 is dried at a temperature of 200° C. for 2 hours and is then calcined at a temperature of 600° C. for 2 hours. Thus, the second catalyst layer 3 containing 6 g/liter of Pd is formed on the outer surface of the first catalyst layer 2.

Figure 2:
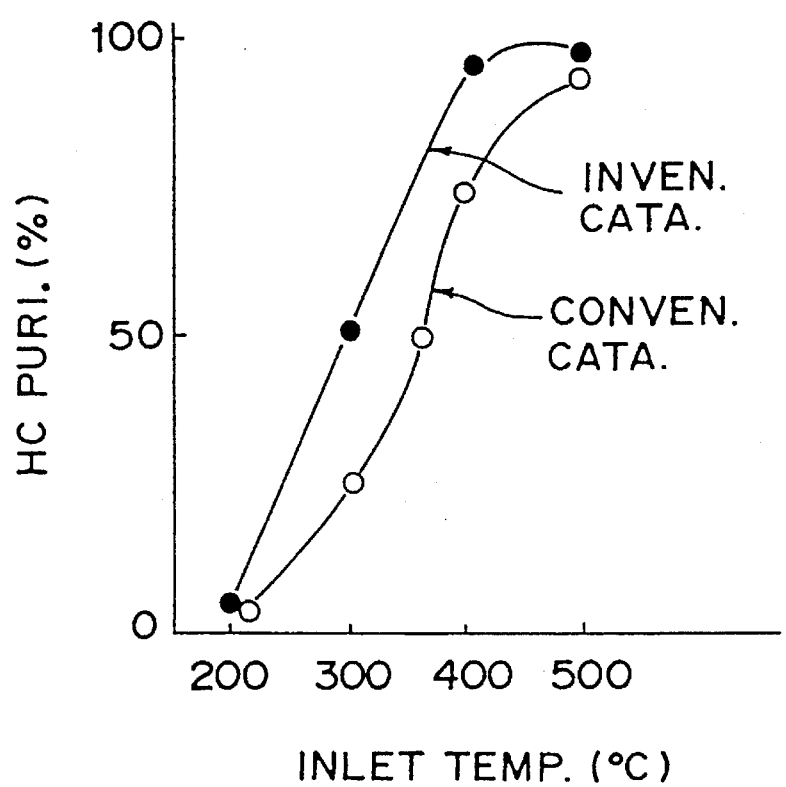
FIG. 2 is a graph showing the HC purifying characteristics of the catalyst of the first embodiment in comparison with those of a conventional catalyst.
Figure 3:
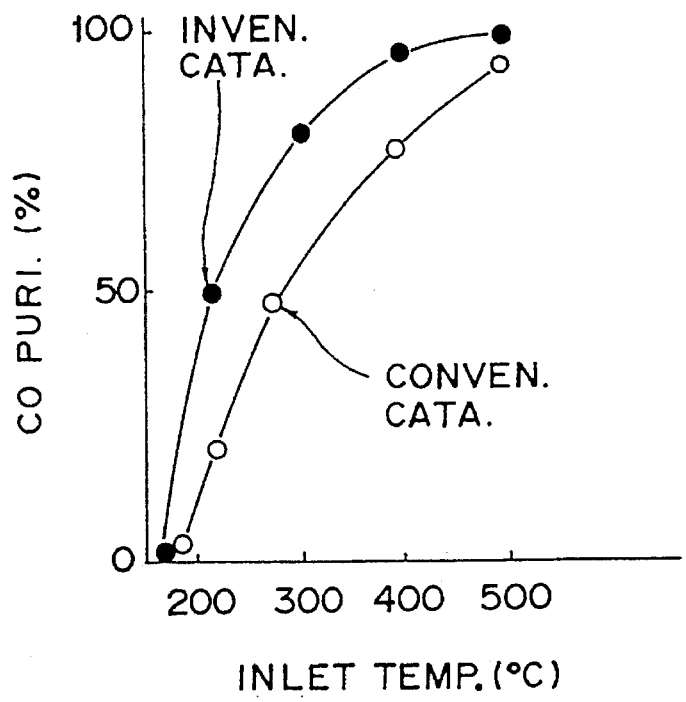
FIG. 3 is a graph showing the CO purifying characteristics of the catalyst of the first embodiment in comparison with those of the conventional catalyst.
Figure 4:
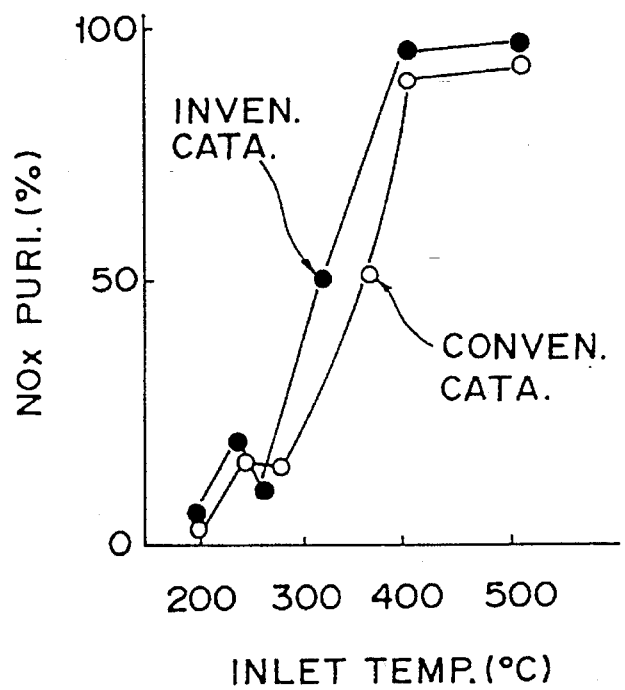
FIG. 4 is a graph showing the NOx purifying characteristics of the catalyst of the first embodiment in comparison with those of the conventional catalyst.

The exhaust gas purifying catalyst obtained in the above described manner was subjected to aging at 1000° C. over a time period of 50 hours. A catalyst according to the first embodiment of the present invention was thus obtained. The catalyst was examined for its purification capabilities with respect to HC, CO and Nox, respectively. For purposes of comparison, a conventional catalyst was prepared which comprised a single catalyst layer carrying ceria and alumina in combination and containing 10 g/liter of Pd which was subjected to aging in the same way as above described. Similar examinations were made with this conventional catalyst. The purification capabilities of the catalyst of the present invention with respect to HC, CO and NOx are shown in FIGS. 2, 3 and 4, respectively, with those of the conventional catalyst also shown in comparison. It can be seen from these drawings that the catalyst of the present invention has higher purification capabilities than the conventional catalyst, even at low temperatures.

Figure 5A:
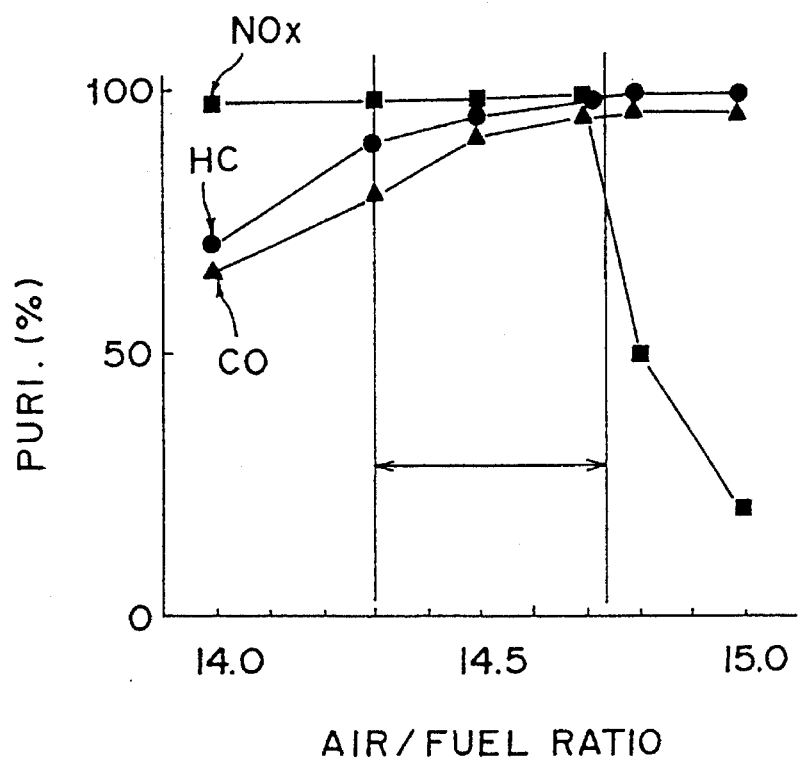
FIG. 5A is a graph showing the relationships between the air-to-fuel ratio and the foregoing purification characteristics of the catalyst of the first embodiment.
Figure 5B:
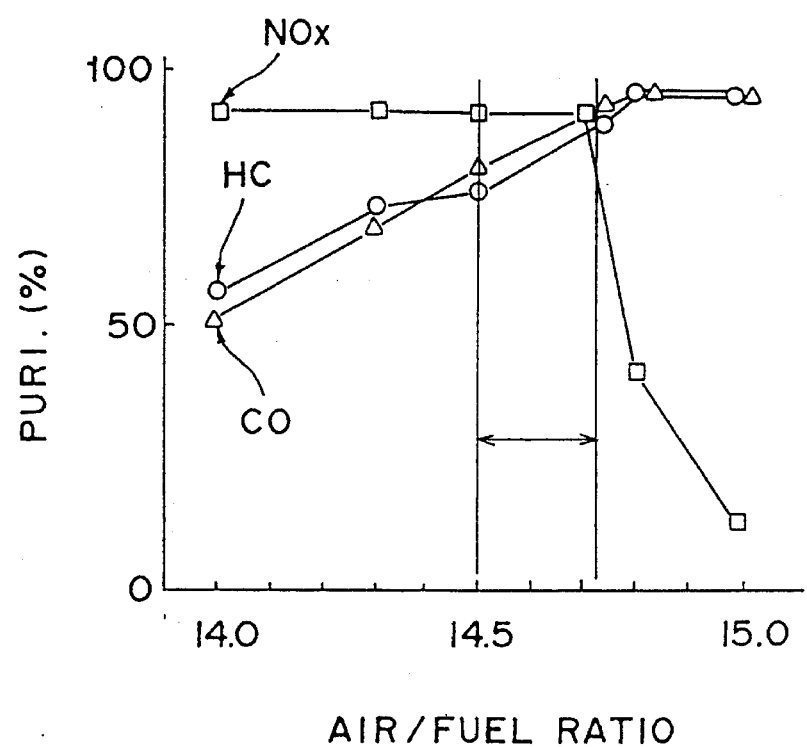
FIG. 5B is a graph similar to FIG. 5A, but showing the relationships of the conventional catalyst.

The range of the air-to-fuel ratio within which purification factors are 80% or more with respect to HC, CO and NOx were examined with both the catalyst of the present invention and the conventional catalyst. The characteristic relationships between the air-to-fuel ratio and respective purification factors, as observed with the catalyst of the present invention, are shown in FIG. 5A, and those observed with the conventional catalyst are shown in FIG. 5B. As can be understood from the figures, the range referred to above for the catalyst of the present invention is A/F=14.30 to 14.74, or two times as high as that for the conventional catalyst (A/F=14.50 to 14.72). Especially, the range for the former is substantially enlarged on the rich side.

The reason for this may be that Pd is dispersedly contained in the first and second catalyst layers 2 and 3, and that Pd and ceria are present in mixture in the second catalyst layer. The fact that Pd is dispersedly contained in the two catalyst layers, namely, the first catalyst layer 2 formed on the surface of the honeycomb-shaped carrier 1, and the second catalyst layer 3 formed on the outer surface of the first catalyst layer 2, permits good dispersion of Pd in the direction of thickness of the first and second catalyst layers 2 and 3. In the second catalyst layer 3, ceria is present between Pd components, and this assures better Pd dispersion. By virtue of such arrangement any possible decrease of Pd activity due to sintering can be inhibited without involving any decrease in the total Pd content, with the result that the activity of Pd can be well utilized at low temperatures, which in turn results in improvement of the purification performance of the catalyst at low temperatures. Further, because of the fact that only one kind of noble metal active species, i.e., Pd, is used, it is unlikely that alloying will occur as in the case of Pd being used in combination with Pt, for example. In addition, as the noble metal active species, Pd has higher heat resistance than Pt.

On the other hand, ceria is present in the second catalyst layer 3, a position for ready contact with exhaust gases, so that it can go into fast reaction with exhaust gases. This fact permits the $O_2$ storage effect of the ceria to be efficiently exerted, thus rendering the exhaust gas atmosphere to be brought close to the stoichiometric air-to-fuel ratio. Accordingly, the aforementioned range of the air-to-fuel ratio can be enlarged. This is considered to be another factor which contributes to the improved purification performance of the catalyst of the present invention at low temperatures. The alumina component has a high ratio of surface to volume, and this helps increase the reactivity of the catalyst itself. Further, since the alumina is present in the first catalyst layer 2 on which is placed the second catalyst layer 3, the influence of exhaust gas heat upon the alumina is alleviated by the second catalyst layer 3, so that the alumina can be prevented from being subject to crystal changes due to heat. Thus, any appreciable decrease in the specific surface area of the alumina due to such crystal change is inhibited and accordingly the reactivity of the catalyst can be well maintained. This may be another factor which contributes to the improved purification capability of the catalyst at low temperatures.

In addition to the above mentioned Pd dispersion, as one factor explanatory of the mechanism in which the presence of Pd and ceria in combination helps inhibit Pd sintering, it may be pointed out that possible dissociation reaction of Pd ($PdO \rightarrow Pd + 1/2O_2$) will tend to shift toward the higher temperature side. When a dissociation reaction occurs, Pd is metallized and made ready for becoming sintered. Generally, it is considered that such dissociation reaction will take place at a temperature of about 900° C. However, because of the fact that Pd is present together with ceria, such dissociation reaction will not take place unless there is a temperature rise to about 1000° C., for example. Presumably, therefore, such dissociation reaction itself may have been inhibited, and accordingly sintering may have also been inhibited.

Figure 6:
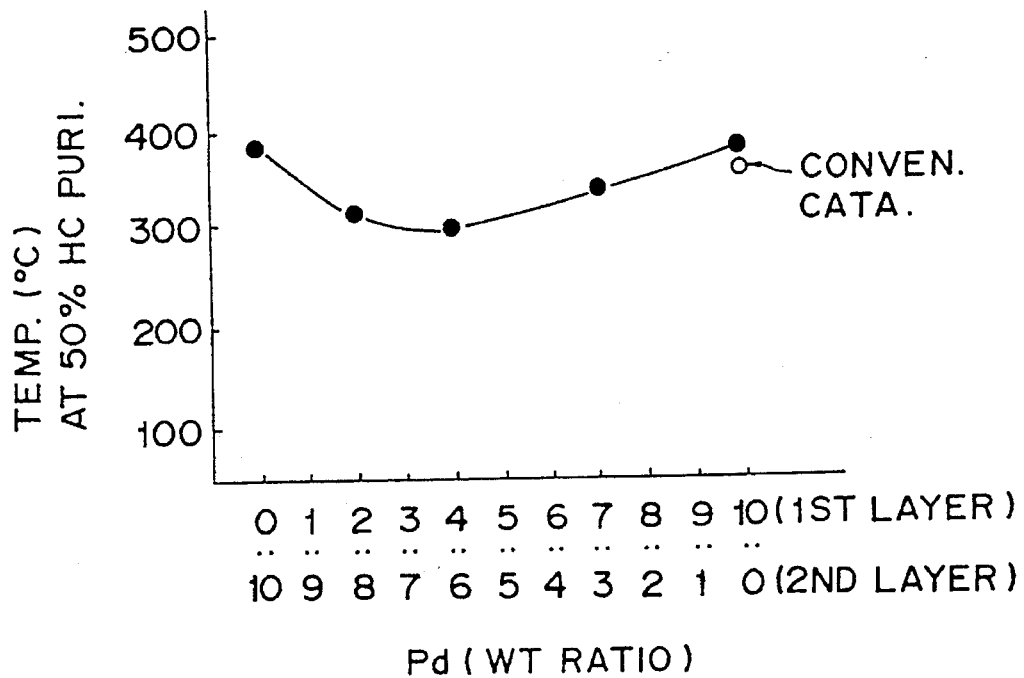
FIG. 6 is a graph showing the relationship between the Pd weight ratio and the exhaust gas inlet temperature in the first embodiment when 50% of HC has been purified.

Now, in conjunction with the above described embodiment of the present invention, a series of exhaust gas purifying catalysts was prepared wherein the weight ratio of the Pd content of the second catalyst layer 3 to the Pd content of the first catalyst layer 2 (the second catalyst layer 3/the first catalyst layer 2) was varied by 10% each within a weight ratio range of 10/0 to 0/10. With these catalysts, respective inlet gas temperatures were examined when the purification factor of each respective catalyst reached 50%. The results are shown in FIG. 6. As may be appreciated from the drawing, whereas such temperature exceeds 350° C. in the case of the conventional catalyst, the exhaust gas purifying catalysts of the present invention in which the weight ratio is within the range of 3/7 to 9/1 achieved a purification factor of 50% with respect to HC, even at low temperatures of 330° to 340° C. In particular, an exhaust gas purifying catalyst of the present invention in which the weight ratio was 6/4 achieved 50% HC purification at the lowermost temperature level of 300° C.

The reason for this may be that Pd is dispersedly contained in two catalyst layers, i. e., the first and second catalyst layers 2 and 3 within the weight ratio range of 3/7 to 9/1, whereby satisfactory balance can be obtained between the Pd dispersion in the thickness direction of the first and second catalyst layers 2 and 3 and the total Pd content of the two layers as a whole. It may be considered that this enables the catalyst to efficiently exhibit its activity to a satisfactory degree, even at low temperatures. Basically, better Pd dispersion is obtained where the Pd contents of the first and second catalyst layers 2 and 3 are even with each other, or in other words, Pd dispersion goes better as the weight ratio goes closer to 5/5. However, when contact of Pd with exhaust gases is considered, it is believed that most satisfactory results can be obtained where the Pd content of the second catalyst layer 3 is slightly greater than that of the first catalyst layer 2, that is, the weight ratio is 6/4. If the weight ratio is less than 3/7 or more than 9/1, Pd dispersion in the thickness direction and/or in the first and second catalyst layers 2 and 3 in which Pd is present is hindered, with the result that the catalyst would be no much different in respect of purification performance from any conventional catalyst in which Pd is contained in a single catalyst layer.

Figure 7:
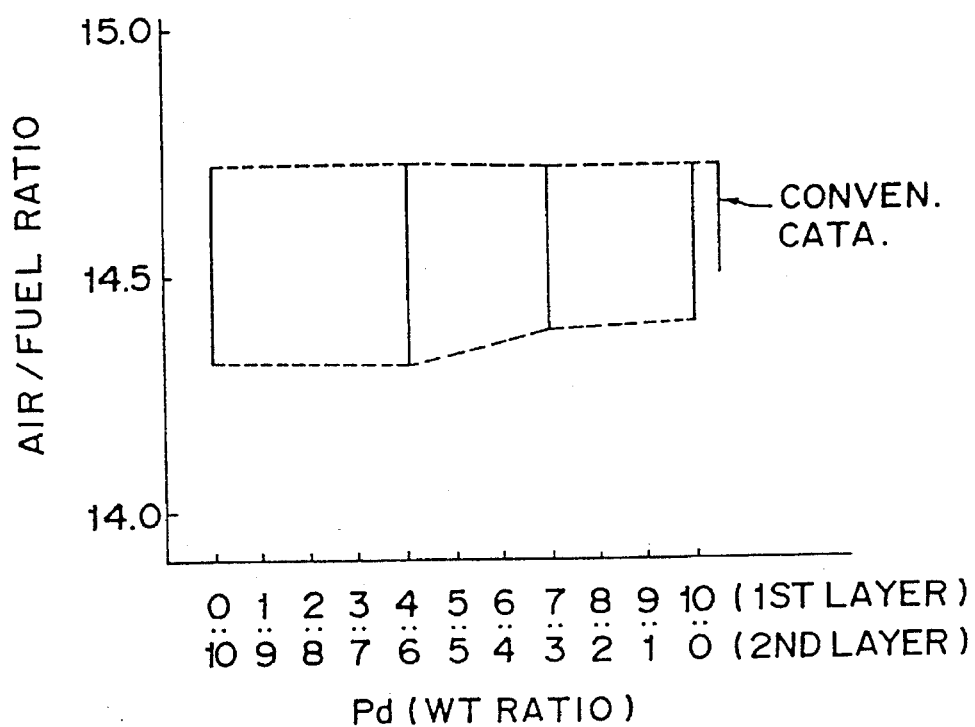
FIG. 7 is a graph showing the relationship between the Pd weight ratio and the air-to-fuel ratio in the first embodiment.

Further, with respect to various catalysts in which the weight ratio is varied, respective ranges of the air-to-fuel ratio referred to above were examined. The examination results are shown in FIG. 7. As may be appreciated from the drawing, there is a general tendency that the greater the Pd content of the second catalyst layer 3, the larger is the range. Especially where the weight ratio is 6/4, most satisfactory results are obtained.

Second Embodiment

Figure 8:
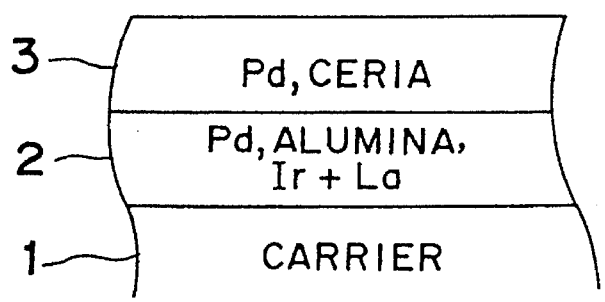
FIG. 8 is a view similar to FIG. 1, but according to a second embodiment of the present invention.

FIG. 8 schematically shows an exhaust gas purifying catalyst according to the second embodiment of the present invention, wherein Ir (iridium), in the form of a composite with La (lanthanum), a rare earth metal, is contained in the first catalyst layer 2. Other structural features of the catalyst, including the weight ratio of the Pd content of the first catalyst layer 2 to the Pd content of the second catalyst layer 3, are identical with those of the foregoing first embodiment.

The method of producing this exhaust gas purifying catalyst will be explained below. It is noted that the manner of forming the second catalyst layer 3 is identical with that in the first embodiment 1 and, therefore, description in that regard is omitted.

In order to form the first catalyst layer 2, to an γ-$Al_2O_3$ powder, as alumina material, is added iridium chloride ($IrCl_4$), as Ir material, in such a way that the Ir component is carried at the rate of 1 g/liter. This mixture is then mixed with 5 wt % of La, as rare earth metal, relative to the total Pd content. To 480 g of the resulting mixture powder are added 120 g of boehmite, 1 liter of water and 10 cc of nitric acid, and agitation is effected to provide a slurry. The honeycomb-shaped carrier 1 is dipped in the slurry and then withdrawn therefrom. After excess slurry present on the surface of the honey-comb-shaped carrier 1 is removed by airblowing, the carrier 1 is dried at a temperature of 250° C. for 2 hours and is then calcined at a temperature of 600° C. for 2 hours. Thus, alumina, and Ir+La, as component elements to be contained in the first catalyst layer 2, is carried on the surface of the carrier 1.

Figure 9:
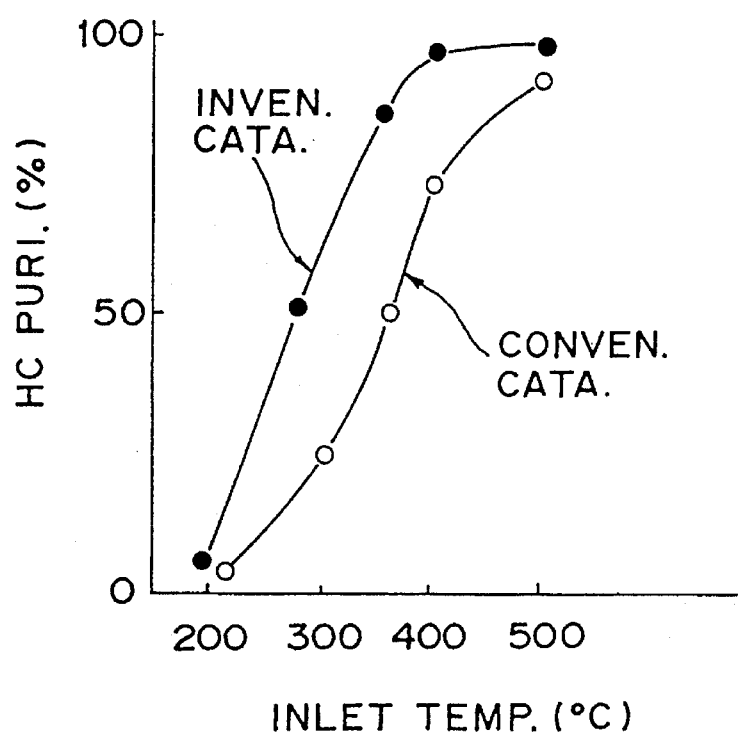
FIG. 9 is a graph showing the HC purifying characteristics of the catalyst of the second embodiment in comparison with those of the conventional catalyst.
Figure 10:
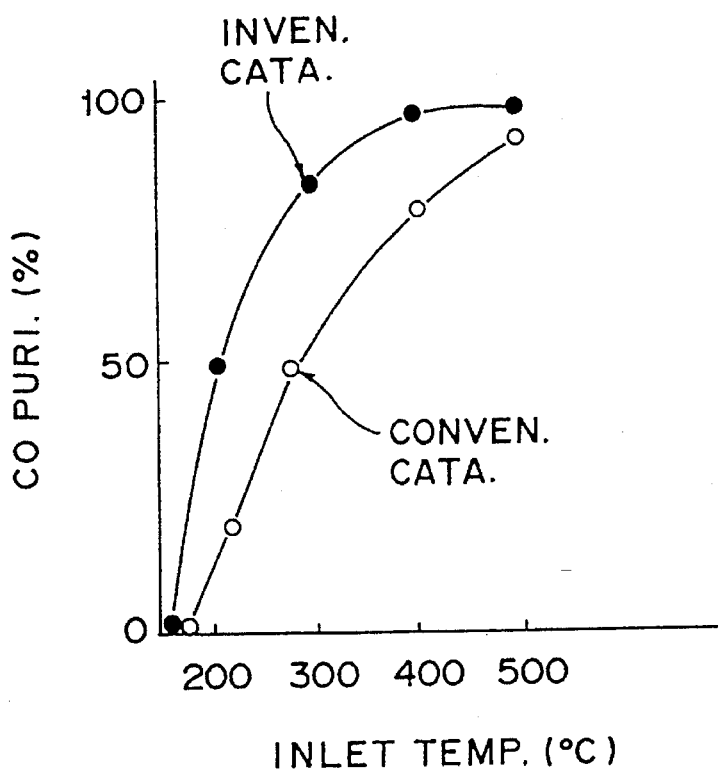
FIG. 10 is a graph showing the CO purifying characteristics of the catalyst of the second embodiment in comparison with those of the conventional catalyst.
Figure 11:
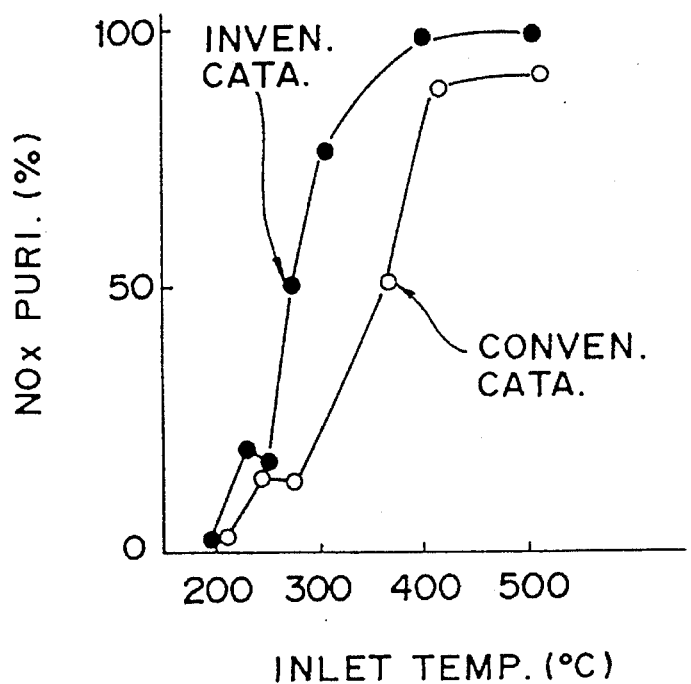
FIG. 11 is a graph showing the NOx purifying characteristics of the catalyst of the second embodiment in comparison with those of the conventional catalyst.

The alumina is then impregnated with an aqueous solution of dinitrodiamminepalladium prepared in such a way that a given amount of Pd may be carried on the alumina. The alumina so impregnated is dried at a temperature of 250° C. for 2 hours, and is then calcined at a temperature of 600° C. for 2 hours. Thus, the first catalyst layer 2 containing alumina, Pd, and an Ir-La composite is formed. Subsequently, the second catalyst layer 3 is formed on the outer surface of the first catalyst layer 2. The exhaust gas purifying catalyst obtained in the above described manner was subjected to aging at 1000° C. over a time period of 50 hours. The catalyst according to the second embodiment of the present invention was thus obtained. The catalyst was examined for its purification capabilities with respect to HC, CO and NOx, respectively. For purposes of comparison, a conventional catalyst was prepared which comprised a single catalyst layer carrying ceria and alumina in combination, with Pd and the Ir-La composite contained therein in same proportions as in the second embodiment of the present invention, which was subjected to aging in the same way as above described. Similar examinations were made with this conventional catalyst. The purification capabilities of the catalyst of the present invention with respect to HC, CO and NOx are shown in FIGS. 9, 10 and 11, respectively, with those of the conventional catalyst also shown in comparison. It can be seen from these drawings that the catalyst of the present invention has higher purification capabilities than the conventional catalyst, at low temperatures.

Figure 12A:
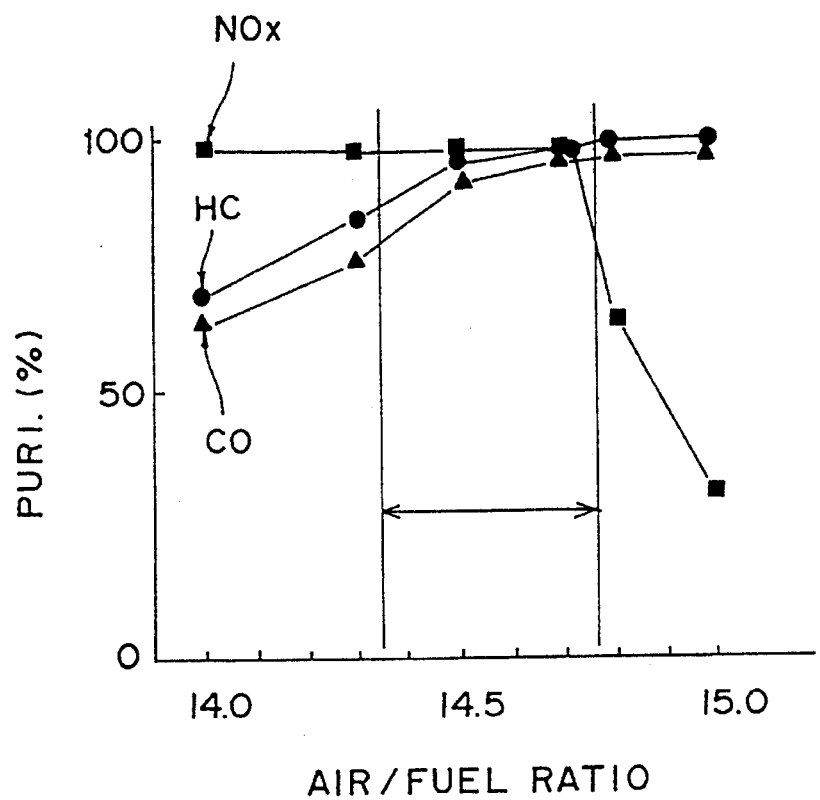
FIG. 12A is a graph showing the relationships between the air-to-fuel ratio and the foregoing purification characteristics of the catalyst of the second embodiment.
Figure 12B:
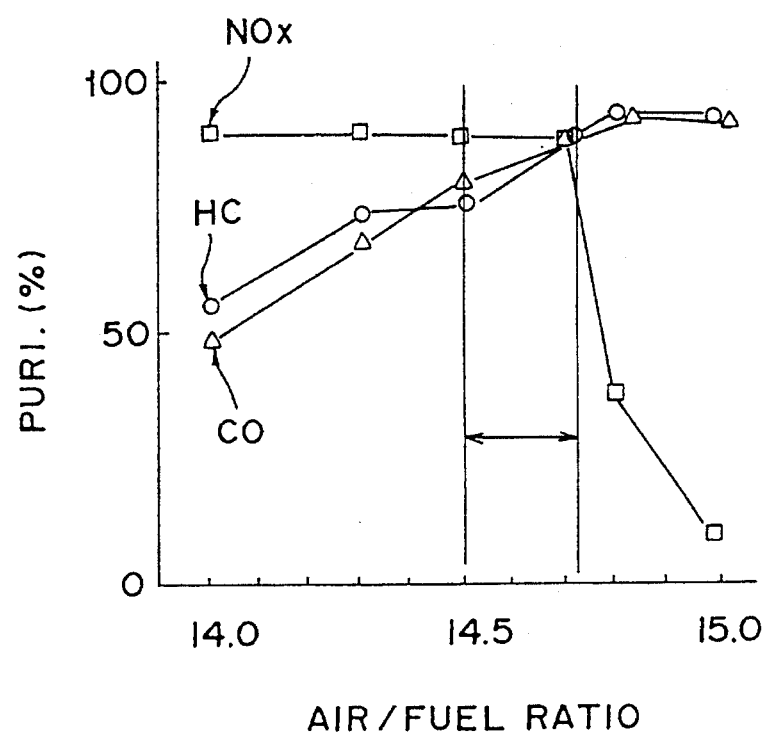
FIG. 12B is a graph similar to FIG. 12A, but showing the relationships of the conventional catalyst.

The range of the air-to-fuel ratio within which purification factors are 80% or more with respect to HC, CO and NOx were examined with both the catalyst of the present invention and the conventional catalyst. The characteristic relationships between the air-to-fuel ratio and respective purification factors, as observed with the catalyst of the present invention, are shown in FIG. 12A, and those observed with the conventional catalyst are shown in FIG. 12B. As can be understood from the figures, such range for the catalyst of the present invention is A/F=14.34 to 14.76, or nearly two times as high as that for the conventional catalyst (A/F= 14.50 to 14.72). This range for the former extends widely, not only on the rich side but also on the lean side.

The reason for this may be that the Ir contained in the first catalyst layer 2 is characteristically ready to adsorb NOx in exhaust gases, which fact can contribute substantially to reduction and purification of NOx, not to mention the reason explained with respect to the foregoing first embodiment. It is considered that this can enhance the purification capability of the catalyst with respect to NOx in particular in exhaust gases on the lean side. In this case, Ir in the form of a composite with La can exhibit improved heat resistance and this serves to prevent possible decrease in the activity of Ir due to heat. This is believed to be a factor contributive to purification capability improvement at low temperatures.

Figure 13:
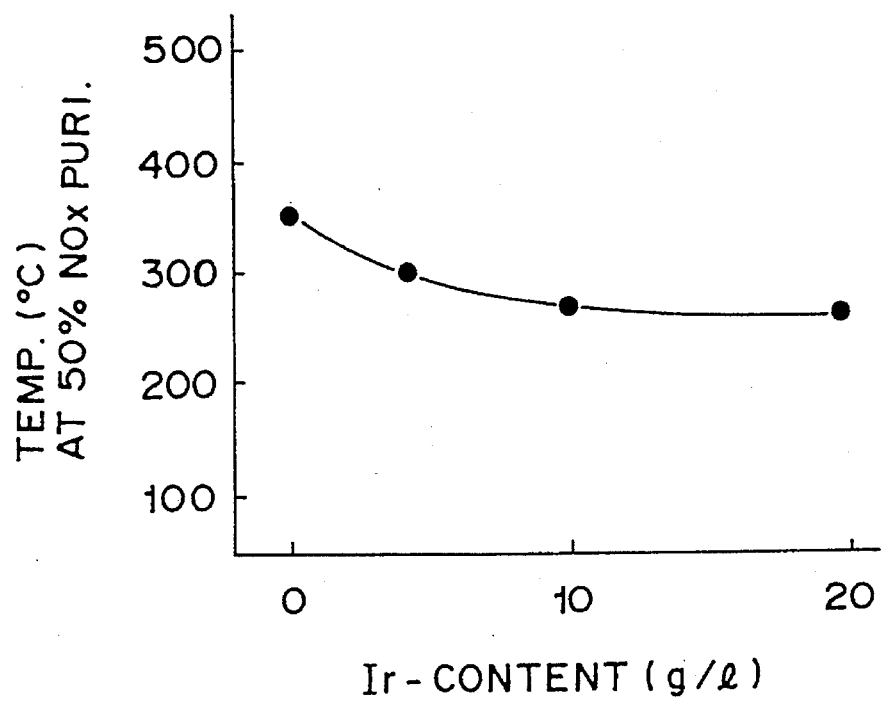
FIG. 13 is a graph showing the relationship between the Ir content and the exhaust gas inlet temperature in the second embodiment when 50% of HC has been purified.

Now, in conjunction with the above described embodiment of the present invention, a series of exhaust gas purifying catalysts was prepared wherein the Ir content was varied within the range of 0 g/liter to 2.0 g/liter, and with these catalysts, respective inlet gas temperatures were examined when the HC purification factor of each respective catalyst was 50%. The results are shown in FIG. 13. As can be seen from the drawing, the temperature tends to decrease as the Ir content increases, except that at the Ir content of 1.0 g/liter or more, the temperature will remain almost same.

Figure 14:
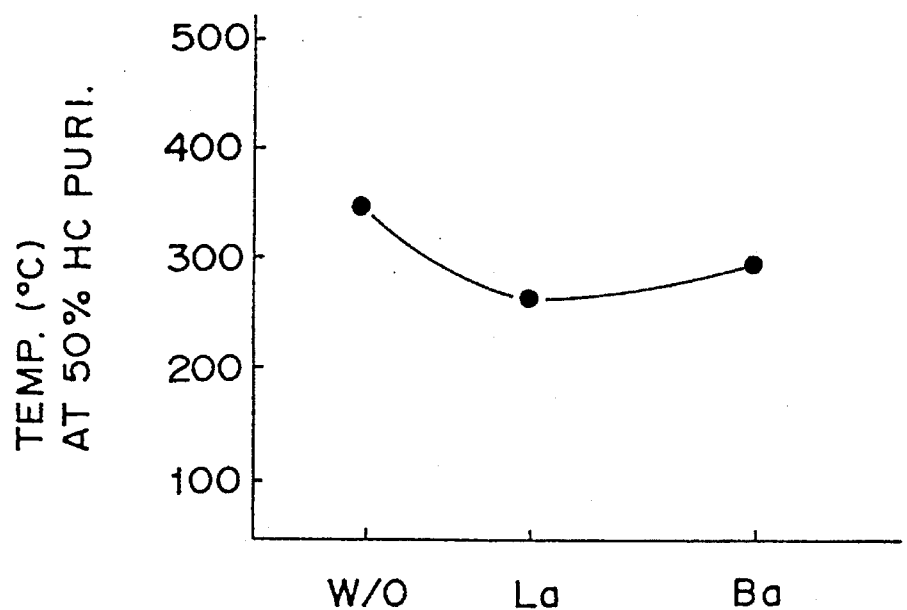
FIG. 14 is a graph showing the relationship between individual additives and the exhaust gas inlet temperature in the second embodiment when 50% of HC has been purified.

Again, with respect to exhaust gas purifying catalysts containing Ba (barium), as an alkali earth metal, instead of La, and those containing no such additive, respective inlet gas temperatures were examined when the HC purification factor of each respective catalyst was 50%. The results are shown in FIG. 14. As may be seen from the drawing, catalysts containing La or Ba had a good advantage in low temperature characteristics over those having no La or Ba content. Specifically, those containing La exhibited best low-temperature characteristics, say, at a temperature level of about 270° C., and those containing Ba came next, at a temperature level of about 290° C. Those having no such additive content were active at a higher temperature, say, about 350° C.

In the above described second embodiment, Ir is contained in the first catalyst layer 2, but alternatively Ir may be contained in the second catalyst layer 3, or in both the first and second catalyst layers 2 and 3.

In the above second embodiment, Ir is used in the form of a composite with La or Ba, but alternatively Ir may be used in the form of a composite oxide or solid solution containing a rare earth metal other than La or an alkali earth metal other than Ba.

Third Embodiment

Figure 15:
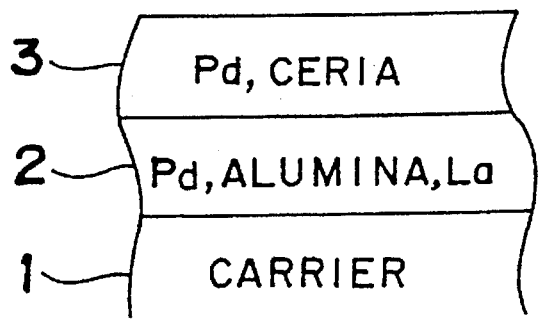
FIG. 15 is a view similar to FIG. 1, but according to a third embodiment of the present invention.

FIG. 15 schematically shows an exhaust gas purifying catalyst according to a third embodiment of the present invention, wherein the alumina in the first catalyst layer 2 has a specific surface area of 300 $m^2/g$ and wherein the first catalyst layer 2 contains La as an additive for stabilizing the heat resistance of the alumina. Other structural features of the catalyst are identical with those of the foregoing first embodiment. In the present embodiment, the alumina is produced in accordance with the alkoxide process, and the above mentioned additive is added in the form of a compound based on $La(NO_3)_3$, a nitroxide, in the stage of hydrolysis in the process for alumina production.

The method of producing this exhaust gas purifying catalyst will be explained below. It is noted that the manner of forming the second catalyst layer 3 is identical with that in the first embodiment and, therefore, description in that regard is omitted.

First, in order to produce $\gamma$-$Al_2O_3$, as alumina material, 240 g of aluminum isopropoxide and 216 g of hexylene glycol were mixed together, and the mixture is heated and agitated in an oil bath at a temperature of 120° C. for 4 hours. Thereafter, to the mixture is added 90 g of water and hydrolysis is carried out, and the hydrolyzate is then gelled. In this embodiment, La as an additive is added in such a condition that the la, together with Pd, is mixed into the water, during the stage of hydrolysis. In this case, the proportions of the additives are chosen to be 5 wt % each relative to the total amount of alumina production, and La is added in the form of $La(NO_3)_3$, a nitroxide. The resulting mass is allowed to be aged overnight (for 16 hours) while being kept at a temperature of 80° C. After being subjected to drying under reduced pressure, the aged mass is calcined at 600° C. for 3 hours. The $\gamma$-$Al_2O_3$ thus obtained had a specific surface area of 350 $m^2/g$.

In order to form the first catalyst layer 2, 15 g of boehmite, 125 cc of water, and 1.25 cc of nitric acid are added to 60 g of $\gamma$-$Al_2O_3$, and agitation was effected to provide a slurry. The honeycomb-shaped carrier 1 is dipped in the slurry and is then removed therefrom. After excess slurry present on the surface of the carrier 1 is removed by airblowing, the carrier 1 is dried at a temperature of 250° C. for 2 hours and is then calcined at a temperature of 600° C. for 2 hours. Thus, the first catalyst layer 2 containing alumina, Pd and La is formed. Thereafter, the second catalyst layer 3 is formed on the outer surface of the first catalyst layer 2.

Figure 16:
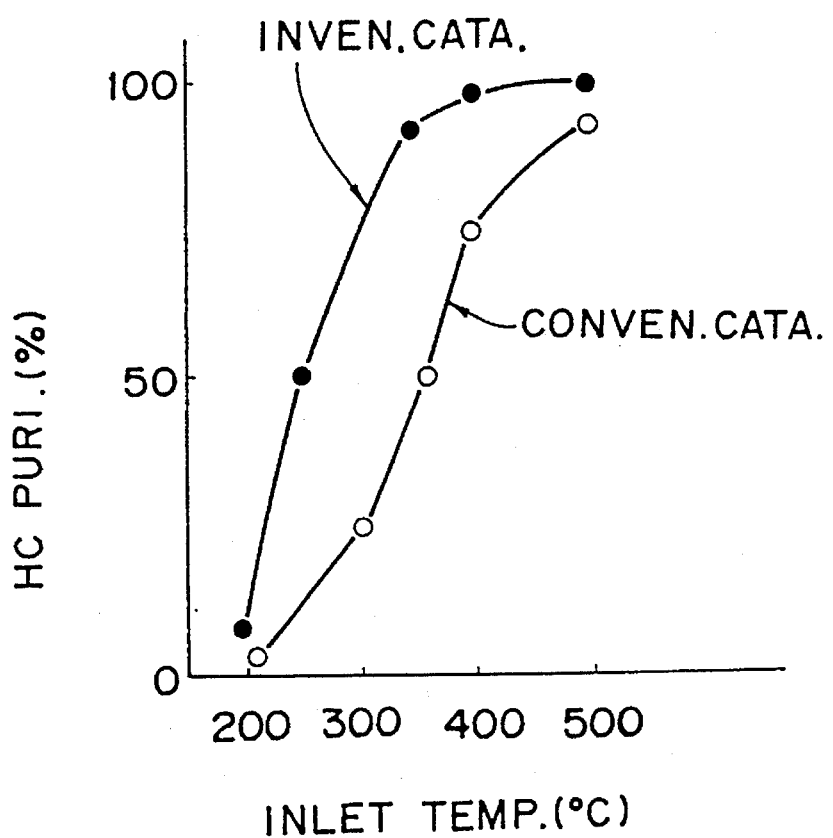
FIG. 16 is a graph showing the HC purifying characteristics of the catalyst of the third embodiment in comparison with those of the conventional catalyst.
Figure 17:
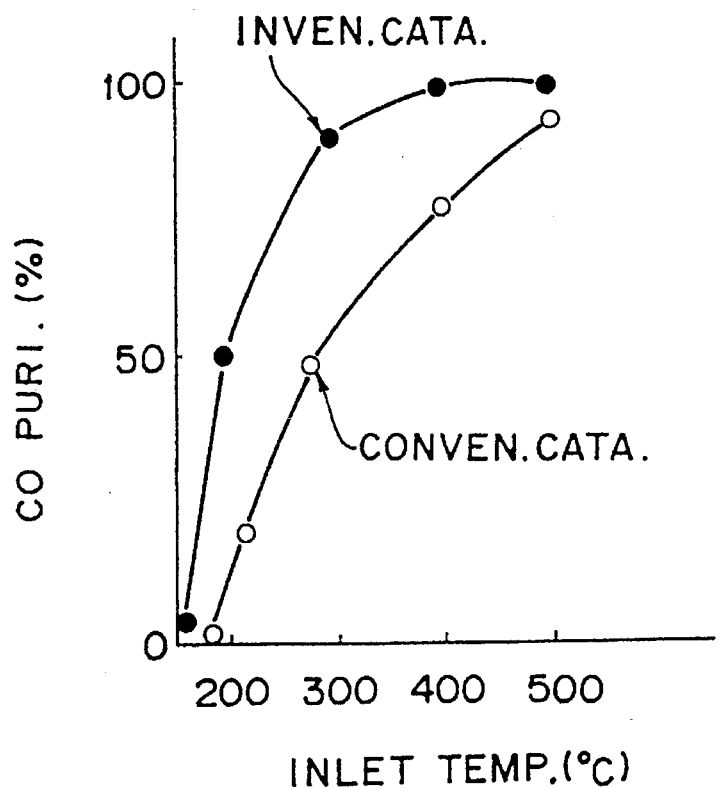
FIG. 17 is a graph showing the CO purifying characteristics of the catalyst of the third embodiment in comparison with those of the conventional catalyst.
Figure 18:
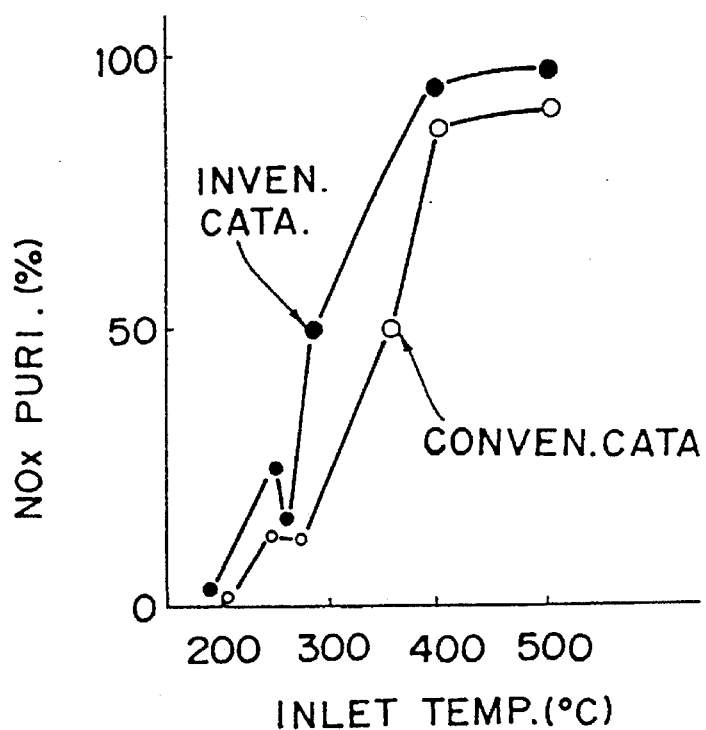
FIG. 18 is a graph showing the NOx purifying characteristics of the catalyst of the third embodiment in comparison with those of the conventional catalyst.

The exhaust gas purifying catalyst obtained in the above described manner was subjected to aging at 1000° C. over a time period of 50 hours. The catalyst according to the third embodiment of the present invention was thus obtained. The catalyst was examined for its purification capabilities with respect to HC, CO and NOx, respectively. For purposes of comparison, a conventional catalyst was prepared which comprised a single catalyst layer carrying ceria and alumina in combination, with Pd and La contained therein in same proportions as in this embodiment of the present invention, which was subjected to aging in the same way as above described. Similar examinations were made with this conventional catalyst. The purification capabilities of the catalyst of the present invention with respect to HC, CO and NOx are shown in FIGS. 16, 17 and 18 respectively, with those of the conventional catalyst also shown in comparison. It can be seen from these drawings that the catalyst of the present invention has higher purification capabilities than the conventional catalyst, at low temperatures.

Figure 19A:
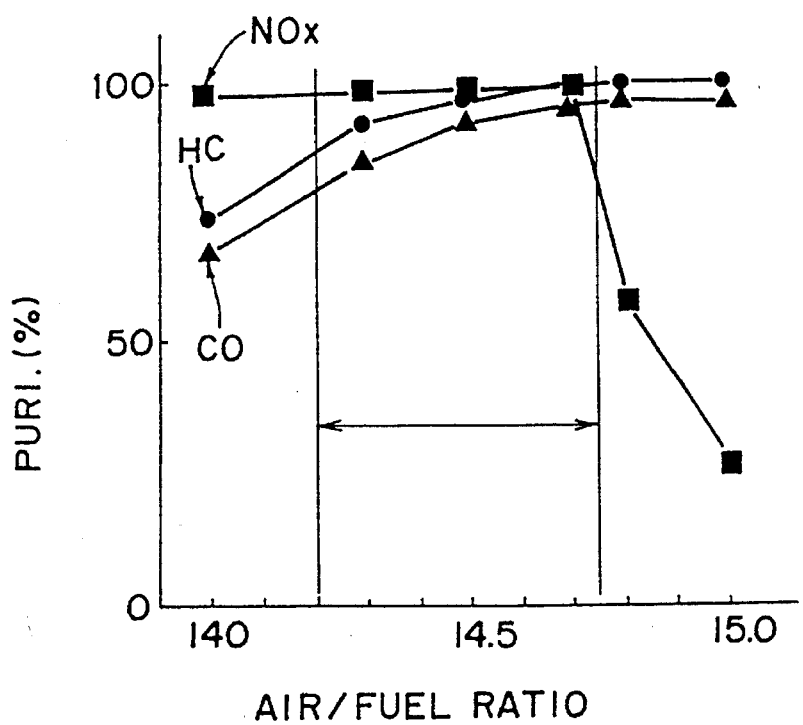
FIG. 19A is a graph showing the relationships between the air-to-fuel ratio and the foregoing purification characteristics of the catalyst of the third embodiment.
Figure 19B:
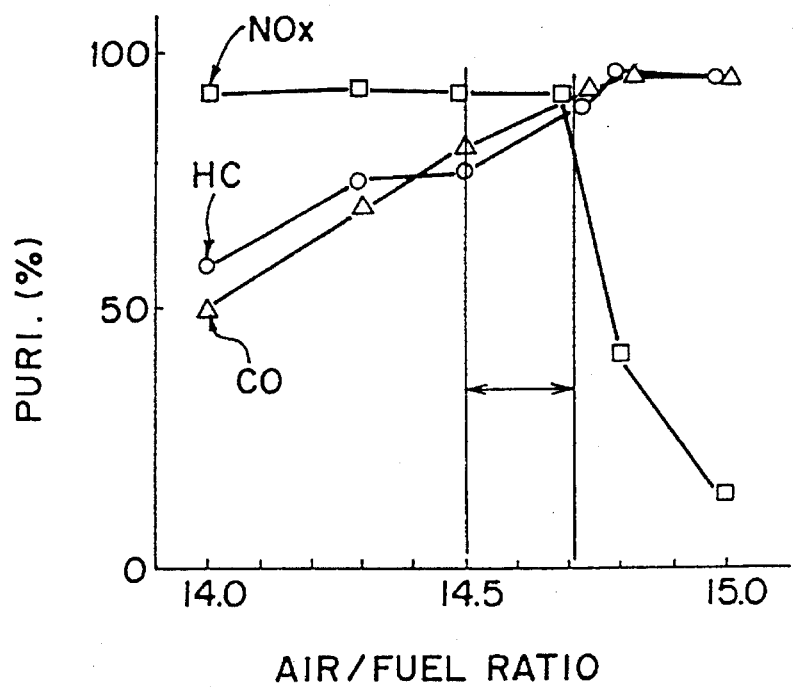
FIG. 19B is a graph similar to FIG. 19A, but showing the relationships of the conventional catalyst.

The range of the air-to-fuel ratio within which purification factors are 80% or more with respect to HC, CO and NOx were examined with both the catalyst of the present invention and the conventional catalyst. The characteristic relationships between the air-to-fuel ratio and respective purification factors, as observed with the catalyst of the present invention, are shown in FIG. 19A, and those observed with the conventional catalyst are shown in FIG. 19B. As can be understood from the figures, such range for the catalyst of the present invention is A/F=14.20 to 14.74, or nearly two times as high as that for the conventional catalyst (A/F= 14.50 to 14.72). This range for the former extends further on the rich side.

The reason for this may be that the alumina has a specific surface area of 350 $m^2/g$ which enables the catalyst itself to achieve a high level of reactivity, and that La is dispersedly contained in the alumina so that the La serves as a stabilizer for the alumina against heat to prevent the alumina from undergoing crystal changes under the influence of heat, not to mention the reason stated with respect to the foregoing first embodiment. Thus, possible decrease in the specific surface area of the alumina due to such crystal change can be prevented so that the reactivity of the catalyst can be maintained at a high level. This is considered to be an important factor which contributes to purification capability improvement at low temperatures. It is noted that the La also serves as a stabilizer for Pd against heat.

Figure 20:
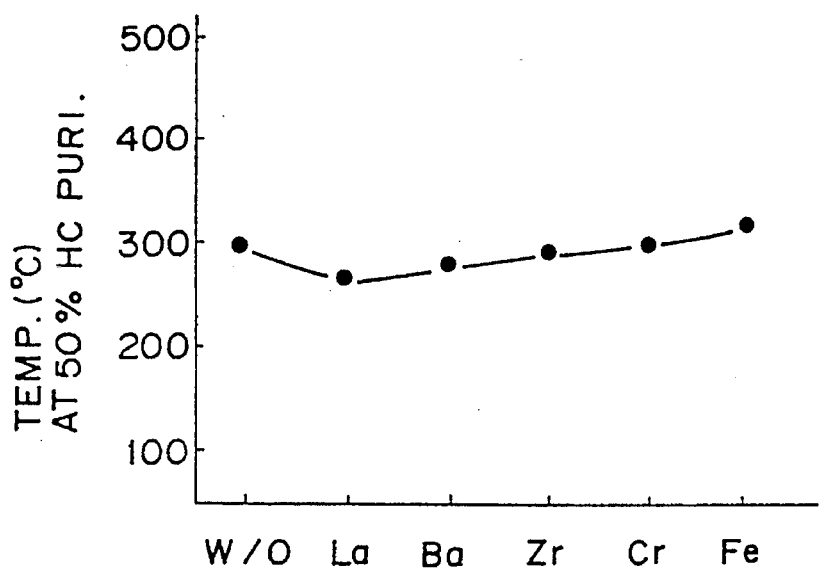
FIG. 20 is a graph showing the relationship between individual additives and the exhaust gas inlet temperature in the third embodiment when 50% of HC has been purified.

During the stage of hydrolysis, with respect to various exhaust gas purifying catalysts wherein Ba, Zr (zirconium), Cr (chromium) and Fe (iron) were added respectively instead of La, and those having no such additive contained therein (w/o) were examined as to respective inlet gas temperatures when the HC purification factor was 50%. The results are shown in FIG. 20. As can be seen from the drawing, catalysts incorporating such additive as La, Ba, or Zr had an advantage in low temperature characteristics over those having no such additive component (w/o) and/or those containing such additive component as Cr or Fe. Specifically, one containing La was active at the lowermost temperature, say, about 270° C., and one containing Ba came next at about 280° C. One containing Zr was active at about 290° C. On the other hand, one containing Cr was active at about 300° C. or about same temperature level as one with no additive. One containing Fe was active at about 320° C.

Figure 21:
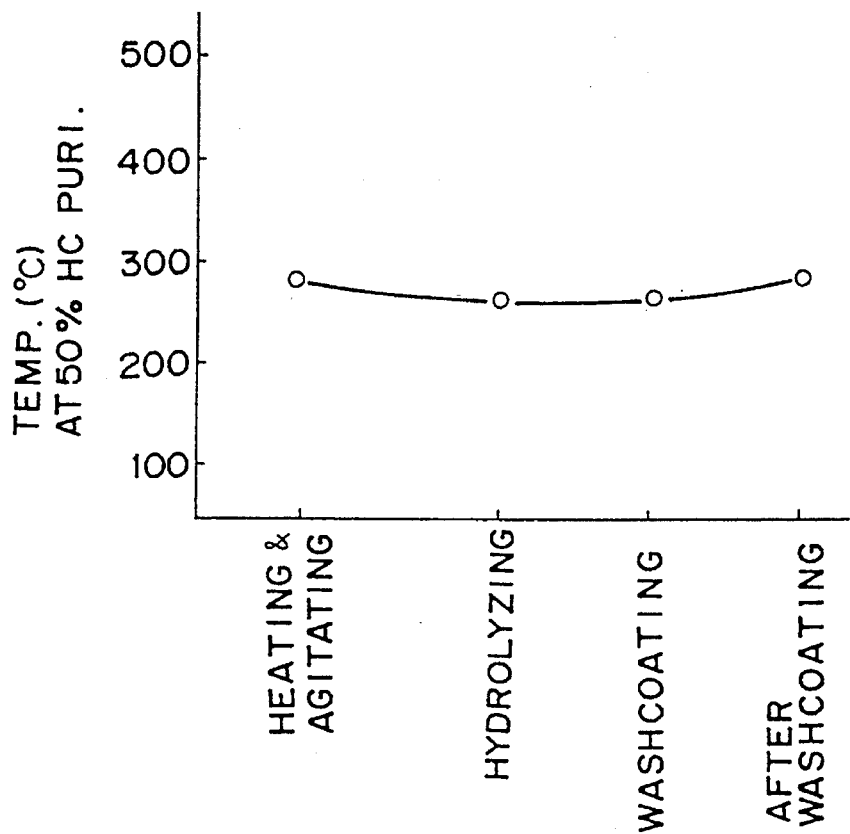
FIG. 21 is a graph showing the relationship between the time of La addition and the exhaust gas inlet temperature in the third embodiment when 50% of HC has been purified.

Also, catalysts with respect to which La addition was made at different stages, say, during a heating and agitating stage; during a hydrolysis stage; during a washcoating stage; and after the washcoating stage, were examined as to respective inlet gas temperatures when the HC purification factor was 50%. It is noted in this connection that La was added in the form of $La(NO_3)_3$ in cases other than addition during the heating and agitating stage in which La was added in the form of $La_2O_3$. The results are shown in FIG. 21. As may be understood from the drawing, all the catalysts exhibited good low-temperature characteristics and, in particular, those for which addition was made during the hydrolysis stage and during the washcoating stage respectively had an advantage, though slight, over the others.

In the foregoing third embodiment, the additive is added to the first catalyst layer 2, but alternatively it may be added to the second catalyst layer 3 or both the first and second catalyst layers 2 and 3. For the purpose of adding to the first catalyst layer 2, the additive may be added in such a way that a solid solution or composite oxide powder made up of the additive and Pd is mixed with ceria powder to obtain a slurry and that the catalyst carrier is dipped into the slurry.

Fourth Embodiment

Figure 22:
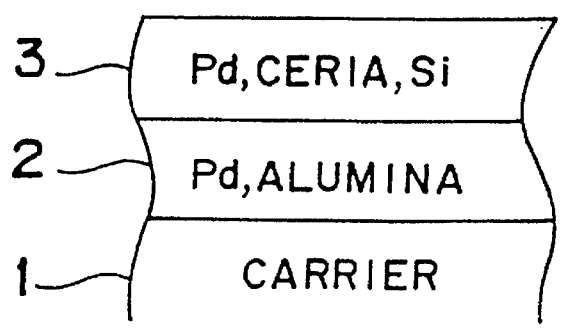
FIG. 22 is a view similar to FIG. 1, but according to a fourth embodiment of the present invention.

FIG. 22 schematically shows an exhaust gas purifying catalyst according to a fourth embodiment of the present invention, wherein Si (silicon) as an additive for preventing Pd from being affected by sulfides in exhaust gases is contained in the second catalyst layer 3. Other structural features of the catalyst are identical with those of the foregoing first embodiment.

The method of producing this exhaust gas purifying catalyst will be explained below. It is noted that the manner of forming the first catalyst layer 2 is identical with that in the first embodiment and, therefore, description in that regard is omitted.

In order to form the second catalyst layer 3, a powder material in the form of a solid solution or a composite oxide which is formed by Si, as an additive, and Pd in combination is mixed with ceria powder, and to 540 g of this mixed powder are added 60 g of boehmite, 1 liter of water, and 10 cc of nitric acid, followed by agitation to obtain a slurry. The honeycomb-shaped carrier 1 on which is formed the first catalyst layer 2 is dipped in the slurry, and is then dried at 200° C. for 2 hours. Then, the honeycomb-shaped carrier 1 is calcined at a temperature of 600° C. for 2 hours. Thus, the second catalyst layer 3 containing ceria, Pd and Si is formed. The proportion of the Si is chosen to be 5 wt % relative to the total Pd content.

Figure 23:
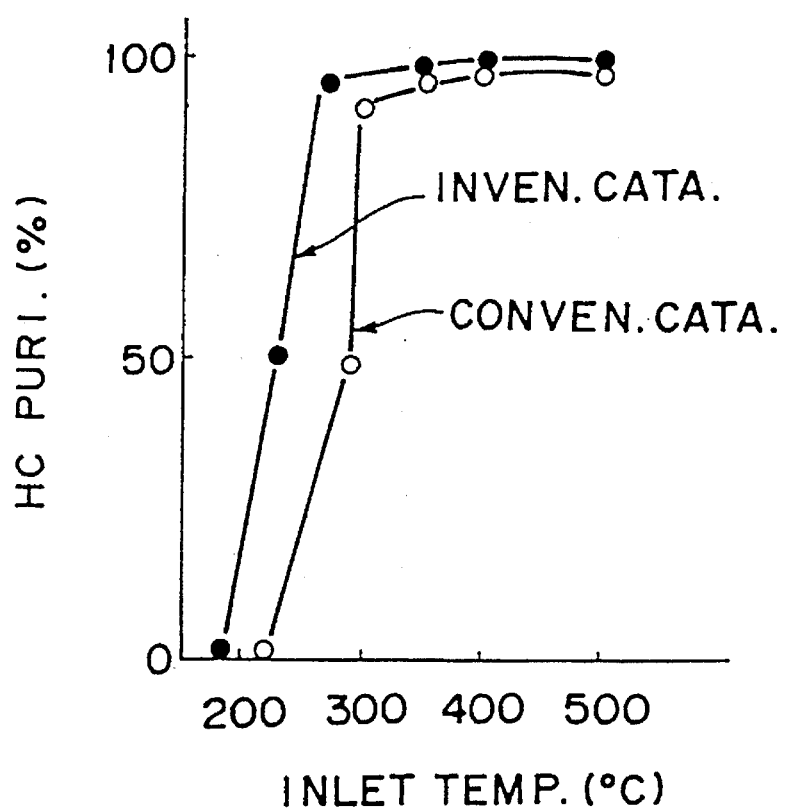
FIG. 23 is a graph showing the HC purifying characteristics of the catalyst of the fourth embodiment in comparison with those of the conventional catalyst.
Figure 24:
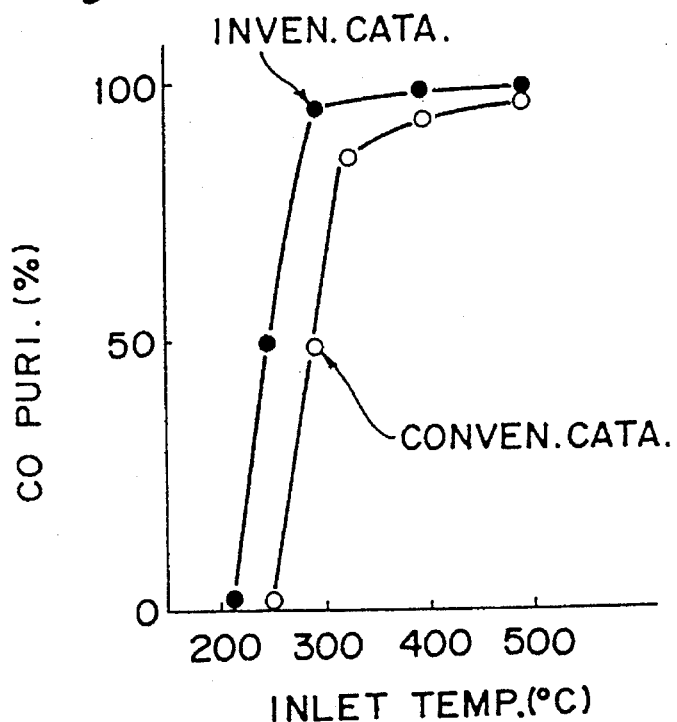
FIG. 24 is a graph showing the CO purifying characteristics of the catalyst of the fourth embodiment in comparison with those of the conventional catalyst.
Figure 25:
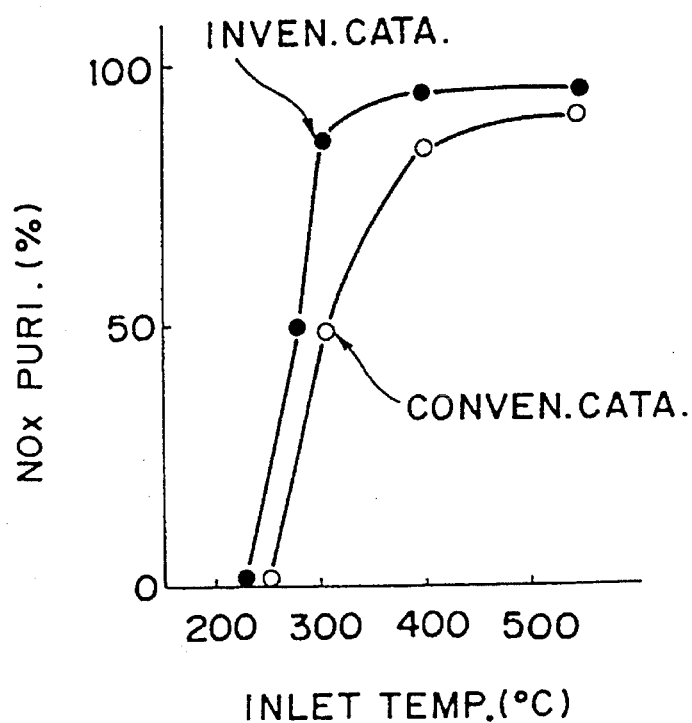
FIG. 25 is a graph showing the NOx purifying characteristics of the catalyst of the fourth embodiment in comparison with those of the conventional catalyst.

The exhaust gas purifying catalyst obtained in the above described manner was subjected to aging at 1000° C. over a time period of 50 hours. The catalyst according to the fourth embodiment of the present invention was thus obtained. The catalyst was examined for its purification capabilities with respect to HC, CO and NOx, respectively. For purposes of comparison, a conventional catalyst was prepared which comprised a single catalyst layer carrying ceria and alumina in combination, with Pd and Si contained therein in same proportions as in this embodiment of the present invention, which was subjected to aging in the same way as above described. Similar examinations were made with this conventional catalyst. The purification capabilities of the catalyst of the present invention with respect to HC, CO and NOX are shown in FIGS. 23, 24 and 25, respectively, with those of the conventional catalyst also shown in comparison. It can be seen from these drawings that the catalyst of the present invention has higher purification capabilities than the conventional catalyst, at low temperatures.

The reason for this may be that the Si contained in the second catalyst layer 3 tends to more easily adsorb sulfides in exhaust gases than Pd. By virtue of this property of Si it is possible to prevent Pd from being adversely affected by sulfides in exhaust gases, to thereby prevent possible decrease of Pd activity due to the unfavorable effect of sulfides. This is considered to be an important factor which contributes to the improved purification performance at low temperatures.

Figure 26:
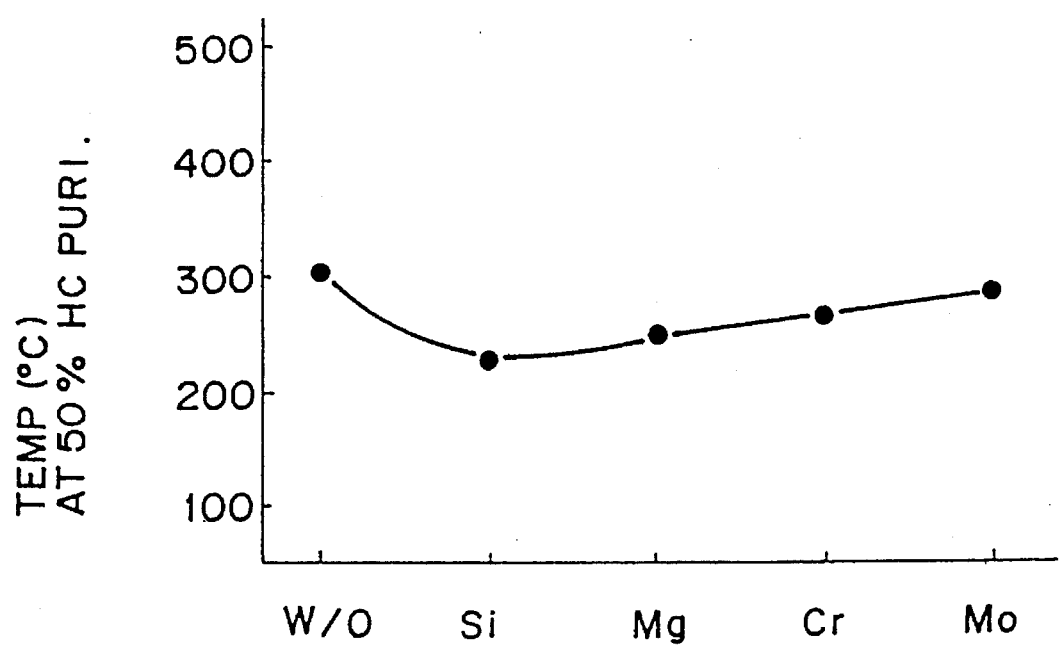
FIG. 26 is a graph showing the relationship between individual additives and the exhaust gas inlet temperature in the fourth embodiment when 50% of HC has been purified.

Now, with respect to exhaust gas purifying catalysts containing Mg (magnesium), Cr, or Mo (molybdehum), instead of Si, and those containing no such additive (w/o), respective inlet gas temperatures were examined when the HC purification factor of each respective catalyst was 50%. The results are shown in FIG. 26. As may be seen from the drawing, catalysts containing Si, Mg, Cr, or Mo had an advantage in low temperature characteristics over those having no such additive content (w/o). Specifically, those containing Si exhibited best low-temperature characteristics, say, at a temperature level of about 230° C., and those containing Mg came next, at a temperature level of about 250° C., followed by Cr at about 270° C., Mo at about 290° C. Those having no such additive content were active at a higher temperature, say, about 300° C.

While, in the foregoing fourth embodiment, additive such as Si is applied to the second catalyst layer 3, it may be applied to the first catalyst layer 2 or both the first and the second catalyst layers 2 and 3. In case that the additive is applied to the first catalyst layer 2, the additive may be applied in such a manner that a solid solution or composite oxide powder made up of the additive and Pd is mixed with alumina powder to prepare a slurry in which the catalyst carrier is dipped.

As described above, where Pd is dispersed in the first and second catalyst layers 2 and 3, and Pd is present together with ceria in the second catalyst layer 3, improved Pd dispersion can be achieved without involving a decrease of the Pd content. Thus, possible activity decrease of Pd due to sintering is inhibited so that the activity of Pd can be exhibited at low temperatures to enhance the purification performance of the catalyst at the low temperatures. Further, the presence of ceria in the second catalyst layer 3 enables efficient achievement of the $O_2$ storage effect of ceria to thereby enlarge the range of the air-to-fuel ratio within which purification factors are 80% or more with respect to HC, CO and NOx, thus contributing to improved purification performance at low temperatures. The alumina in the first catalyst layer 2 has a high ratio of surface to volume through which it serves to increase the reactivity of the catalyst, and is able to inhibit possible decrease of the specific surface area due to a thermal crystal change to maintain the catalytic reactivity. In this way, the alumina also contributes to improved purification performance at low temperatures.

Where Pd is dispersed in the first and second catalyst layers 2 and 3, within a weight ratio (second catalyst layer/first catalyst layer) range of 3/7 to 9/1, the catalyst can efficiently exhibit its activity at low temperatures. This insures improved purification performance at the low temperatures.

Furthermore, Ir, in the form of a composite with alkali earth metal or rare earth metal, may be contained in at least one of the first and second catalyst layers 2 and 3 to thereby enable improvement in the purification performance of the catalyst with respect to NOx in exhaust gases, and improvement in the heat resistance of the Ir. Thus, possible decrease of catalytic activity due to heat can be inhibited, and the purification performance of the catalyst at low temperatures can be enhanced.

Also, where the alumina has a specific surface area of 300 $m^2/g$ or more, the catalyst is enabled to perform its reactivity at a high level. Further, because La, Ba or Zr is dispersedly contained in the alumina, it acts as a heat resistance stabilizer for the alumina to enable the catalyst to maintain high reactivity. This provides for improvement in the reactivity of the catalyst which, in turn, results in improved purification performance at low temperatures.

Where Si, Mg, Cr, and/or Mo is contained in at least one of the first and second catalyst layers 2 and 3, Pd is prevented from being adversely affected by sulfides in exhaust gases. Thus, possible decrease in the activity of Pd due to the effect of sulfides can be well prevented, and this will contribute to improved purification performance at low temperatures.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An exhaust gas purifying catalyst comprising:
   a catalyst carrier;
   a first catalyst layer formed on said catalyst carrier and consisting essentially of palladium and alumina; and
   a second catalyst layer formed on said first catalyst layer and containing palladium and ceria;
   wherein the weight ratio of Pd content in said second catalyst layer to Pd content in said first catalyst layer is from 3/7 to 9/1.

2. The catalyst according to claim 1, wherein said second catalyst layer contains iridium in the form of a composite with one of an alkali earth metal and a rare earth metal.

3. The catalyst according to claim 1, wherein the alumina has a specific surface area of 300 $m^2/g$ or more and contains dispersed therein at least one of substances selected from the group consisting of lanthanum, barium and zirconium.

4. The catalyst according to claim 1, wherein said second catalyst layer contains at least one substance selected from the group consisting of silicon, magnesium, chromium and molybdenum.

5. The catalyst according to claim 2, wherein the alumina has a specific surface area of 300 $m^2/g$ or more and contains dispersed therein at least one of substances selected from the group consisting of lanthanum, barium and zirconium.

6. The catalyst according to claim 2, wherein said second catalyst layer contains at least one substance selected from the group consisting of silicon, magnesium, chromium and molybdenum.

7. The catalyst according to claim 3, wherein said second catalyst layer contains at least one substance selected from the group consisting of silicon, magnesium, chromium and molybdenum.

* * * * *